Aug. 11, 1925.

O. A. PETERS

WELDING APPARATUS

Filed Jan. 11 1924

1,549,215

INVENTOR

Otto A. Peters.

Patented Aug. 11, 1925.

1,549,215

UNITED STATES PATENT OFFICE.

OTTO A. PETERS, OF WICHITA FALLS, TEXAS.

WELDING APPARATUS.

Application filed January 11, 1924. Serial No. 685,590.

*To all whom it may concern:*

Be it known that I, OTTO A. PETERS, a citizen of the United States, residing at Wichita Falls, in the county of Wichita and State of Texas, have invented a new and useful Welding Apparatus; and I do declare the following to be a full, clear, and exact description of the invention, such as will enable others skilled in the art to which it appertains to make and use the same.

My invention relates to acetylene welding apparatus more particularly adapted for welding seams in thick metal; my principal object is to provide means for welding to the entire surface of the spaced ends of thick metal and forming a seam therebetween.

A further object of the invention is to provide means for keeping the metal melted at the working point at all times while the entire seam is being welded.

Yet another object of the invention is to provide a smooth finish at the seam after the same has been welded, thus eliminating the uneven, irregular appearance of the ordinary welding.

With the foregoing in view, the invention resides in the novel subject matter hereinafter described and claimed, the description being supplemented by the accompanying drawing, Figure 1 is a vertical end view.

Figure 1:
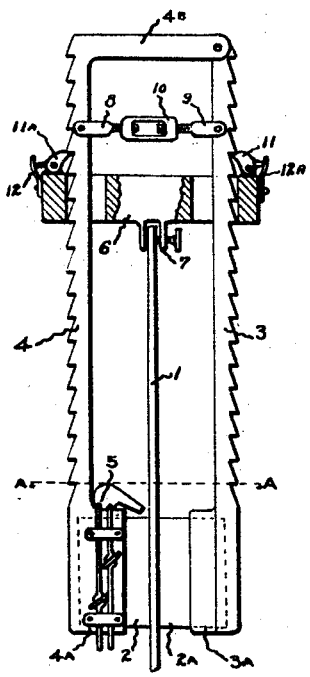
Figure 2:
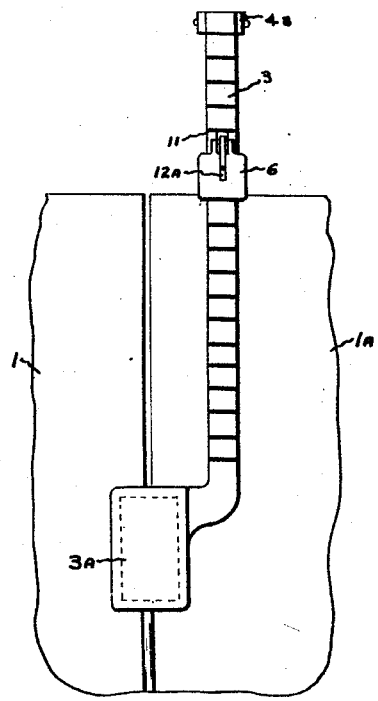
Figure 2 is a vertical side view.
Figure 3:
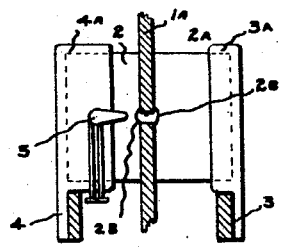
Figure 3 is a top view at the line A—A of Figure 1.
Figure 4:
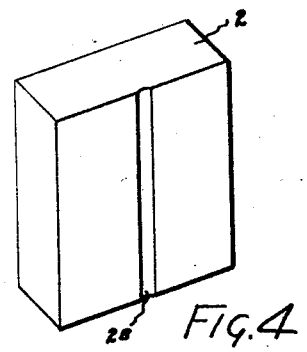
Figure 4 is a perspective view of the forming member.

Having reference to the accompanying drawing, 1 and 1ª are two pieces of metal shown in position to be welded. 2 and 2ª are two forming members, preferably made of fire clay, 2ᵇ is a half round groove in the forming members 2 and 2ª designed for longitudinal association with the seam while being welded to provide a rounding moulded appearance at the welded seam. The forming members 2 and 2ª may be used without the groove when a flat welded seam is desired. 3 is a ratchet supporting arm having a housing 3ª on the lower end thereof for the purpose of holding the forming member 2ª against the metal being welded. 4 is a ratchet supporting arm having the housing 4ª at the lower end thereof for the purpose of holding the forming member 2 against the metal being welded opposite to the forming member 2ª. 4ᵇ is a cross member forming a part of the ratchet supporting arm 4 and attached to the ratchet supporting arm 3, as shown. 5 is an acetylene welding torch of ordinary design clamped to the housing 4ª as shown in Figure 1. The torch 5 is arranged in the position as shown to enable the flame therefrom to heat the seam of the two pieces of metal 1 and 1ª immediately above the forming member 2. 6 is a supporting member clamped to the piece of metal 1ª as shown at 7. The supporting member 6 is provided with a pair of apertures through which the ratchet members 3 and 4 are suspended. 8 is a threaded member pivoted to the ratchet supporting arm 4. 9 is a threaded member pivoted to the ratchet supporting arm 3. 10 is a turnbuckle threaded over the threaded members 8 and 9, the threaded members 8 and 9 are provided with right and left threads in association with the turnbuckle 10, thus providing adjusting means for the ratchet supporting arms 3 and 4. 11 and 11ª are ratchet teeth pivoted to the supporting member 6, as shown. 12 and 12ª are springs for the purpose of holding the ratchet teeth 11 and 11ª in contact with the teeth on the ratchet supporting arms 3 and 4.

When in position for use the operator works on the side of the pieces of metal 1 and 1ª opposite the torch 5, the torch 5 is adjusted to provide a small flame that will keep the metal melted in the seam at the top of the forming members 2 and 2ª, the operator uses a freely movable welding torch and applies the melted welding rod from the side opposite the torch 5, thus allowing the metal to flow freely to both sides of said seam, the operator raises the forming members 2 and 2ª as desired. The ratchet arrangement on the supporting arms 3 and 4 in association with the pivoted ratchet teeth 11 and 11ª hold the forming members 2 and 2ª in any set position, thus it will be noted that by using this means of welding the entire surface of the spaced ends of the pieces of metal 1 and 1ª will be joined and provide a structure equal to a solid casting, whereas, the method of welding heretofore used where a welding torch was used from one side of the metal only, does not join the entire surface of the spaced ends of the pieces of metal for the reason that the heat does not penetrate the metal from one side sufficient to enable a solid weld.

Where it is not desired to provide a smooth finish on the seam, the same results may be obtained with respect to the strength of the weld, by eliminating the aforedescribed apparatus and placing an operator on each side of the metal being welded, and each operator working a welding torch and applying melted welding rod at the same point on opposite sides of the metal being welded, thus welding the entire surface of the spaced ends of the metal.

While it is believed from the foregoing description the nature and advantages of the invention will be readily apparent, I desire to indicate clearly that I do not limit myself to what is herein shown and described and that such changes may be resorted to, when desired, as fall within the scope of what is herein claimed.

What I claim is:

1. A welding apparatus of the character described comprising a frame adapted to be placed about aligning plates which are to be welded together and including a pair of opposed side members, a cross bar adapted to be clamped to the upper edges of the plates and adjustably connected with the side members, housings carried at the lower ends of the side members, forming members mounted in the housings, and an acetylene torch carried by one of the housings, substantially as and for the purpose set forth.

2. A welding apparatus as claimed in claim 1 wherein the frame includes means for connecting the side members so that they may be moved relatively to each other, means for retaining the side members in a fixed position with respect to each other, a supporting bar being provided with apertures for accommodating the side members, the side members being provided with ratchet teeth, and spring pressed pawls on the supporting bar for engagement with said ratchet teeth, substantially as and for the purpose set forth.

3. A welding apparatus as claimed in claim 1 wherein in the forming members are provided with opposed flattened faces and in addition, are provided medially of the side edges thereof with vertical grooves semi-circular in cross-section.

4. A welding apparatus for use in connection with two plates adapted to be arranged in slightly spaced and aligning relation comprising a frame including opposed side members provided with ratchet teeth, means for pivotally connecting the members together, a supporting member adapted to be clamped to the upper edge of one of the plates and provided with spaced apertures for receiving the side members of the frame when the latter is saddled about the plates, housings carried on the lower ends of the side members, forming members in the housings, means for releasably retaining the side members in fixed positions, and an acetylene torch carried by one of the housings, substantially as and for the purpose set forth.

OTTO A. PETERS.